(12) United States Patent
Xiang Li

(10) Patent No.: US 9,144,954 B2
(45) Date of Patent: Sep. 29, 2015

(54) ANTI-SKID ROOF UNDERLAYMENT

(71) Applicant: Innovative Construction Materials (H.K.) Ltd., Beijing (CN)

(72) Inventor: Wang Xiang Li, Shanghai (CN)

(73) Assignee: Innovative Construction Materials (H.K.) Ltd., Beijing (CN)

( * ) Notice: Subject to any disclaimer, the term of this patent is extended or adjusted under 35 U.S.C. 154(b) by 9 days.

(21) Appl. No.: 14/173,300

(22) Filed: Feb. 5, 2014

(65) Prior Publication Data

US 2014/0215962 A1 Aug. 7, 2014

Related U.S. Application Data

(60) Provisional application No. 61/760,705, filed on Feb. 5, 2013.

(51) Int. Cl.
| | | |
|---|---|---|
| *E04D 12/00* | (2006.01) | |
| *B32B 3/26* | (2006.01) | |
| *B32B 38/06* | (2006.01) | |
| *B32B 37/20* | (2006.01) | |

(52) U.S. Cl.
CPC ................ *B32B 3/263* (2013.01); *B32B 38/06* (2013.01); *E04D 12/002* (2013.01); *B32B 37/20* (2013.01); *B32B 2419/06* (2013.01); *Y10T 156/1041* (2015.01); *Y10T 428/24612* (2015.01)

(58) Field of Classification Search
CPC ......... E04D 12/02; E04D 5/10; E04D 12/002; B32B 27/12; B32B 2419/06; B32B 3/2623; B32B 38/02

USPC .......................................... 52/745.06; 156/71
See application file for complete search history.

(56) References Cited

U.S. PATENT DOCUMENTS

| | | | | |
|---|---|---|---|---|
| 4,131,705 | A * | 12/1978 | Kubinsky ...................... | 428/106 |
| 4,376,812 | A * | 3/1983 | West ............................ | 428/165 |
| 5,364,681 | A * | 11/1994 | Pate et al. .................... | 428/137 |
| 6,308,482 | B1 | 10/2001 | Strait | |
| 6,533,884 | B1 * | 3/2003 | Mallik ......................... | 156/209 |
| 2004/0127120 | A1 * | 7/2004 | Zanchetta et al. ............. | 442/45 |
| 2004/0161569 | A1 * | 8/2004 | Zanchetta et al. ........... | 428/40.1 |
| 2005/0037190 | A1 * | 2/2005 | Browne ...................... | 428/304.4 |
| 2005/0247960 | A1 * | 11/2005 | Rim et al. ..................... | 257/211 |
| 2008/0102242 | A1 * | 5/2008 | Hamdar et al. .............. | 428/41.8 |
| 2008/0289289 | A1 * | 11/2008 | Wiercinski et al. ........ | 52/745.06 |
| 2010/0215924 | A1 * | 8/2010 | Di Pede ...................... | 428/196 |

OTHER PUBLICATIONS www.sharksin.us; Sharkskin; pp. 1-2; Kirsch Building Products LLC.

(Continued)

*Primary Examiner* — Elizabeth A Plummer
*Assistant Examiner* — Kyle Walraed-Sullivan
(74) *Attorney, Agent, or Firm* — Fraser Clemens Martin & Miller LLC; William A. Ziehler

(57) ABSTRACT

Anti-skid roof underlayment and methods of making are provided. A first layer is applied to a second layer to at least partially melt the second layer. The first layer and the second layer are embossed and laminated to a substrate, where the first layer and the second layer form an embossed layer on the substrate. The embossed layer has an anti-skid surface thereon.

14 Claims, 2 Drawing Sheets

(56) References Cited

OTHER PUBLICATIONS www.itape.com; NovaSeal Brand; pp. 1-2; Intertape Polymer Group Inc.

www.interwrap.com/titanium; Titanium UDL 25 Plus; pp. 1-2; Interwrap.

* cited by examiner

ANTI-SKID ROOF UNDERLAYMENT

CROSS-REFERENCE TO RELATED APPLICATIONS

This application claims priority to U.S. Provisional Patent Application Ser. No. 61/760,705, filed on Feb. 5, 2013. The entire disclosure of the above application is incorporated herein by reference.

FIELD

The present technology relates to a roof underlayment with an embossed anti-skid surface for improved working or walking traction during installation of the underlayment in various environmental conditions.

BACKGROUND

This section provides background information related to the present disclosure which is not necessarily prior art.

In both residential and commercial roofing applications, a roofing material is used to provide a weather and water protection barrier. Various roofing materials include composite shingles, metal panels or shingles, concrete or clay tiles, wood shakes, slate, concrete and clay tile, and the like. In certain circumstances, water can penetrate the roofing material due to a primary roofing material design, installation practices, or an accidental breach of the primary roofing material. To protect the building interior in these circumstances, a layer called a roofing underlayment can be provided beneath the layer of roofing material. The roofing underlayment acts as a water and a moisture barrier.

Underlayment can be affixed to a roofing surface, for example, by use of various fasteners such as nails, staples, and the like, or through use of an adhesive. The underlayment can be substantially impermeable to moisture. Additionally, it is desirable for the underlayment to have high tensile and tear strengths to reduce the likelihood of tearing during installation and exposure to high winds. Underlayment can preferably be light in weight to facilitate ease of transport and application, and should be able to withstand prolonged exposure to sunlight, air, and water.

Base sheet underlayment for various roof applications include tar paper felt materials. Although widely used, these felt materials are associated with numerous drawbacks that can diminish the integrity of the roof system. For example, felt absorbs moisture causing physical expansion where the material will buckle and wrinkle. Water can contact felt during installation due to weather exposure and felt can also absorb water after installation, where moisture from inside the structure is generated from various sources, such as cooking, showers, industrial processes, etc. The buckling and wrinkling condition causes felt to load up on any fasteners employed, causing tears or elongation of the felt at the fastener, which can compromise the integrity of the roof system. Felt containing moisture can also support growth of mold and fungus. What is more, felt has no natural protection from UV light and can deteriorate when left exposed to direct solar radiation.

Polymeric roof underlayment materials, such as various polyolefin materials, are available that provide a significant improvement over standard felts. Such synthetic polyolefin materials offer optimum levels of tensile strength, light weight, and improved handling characteristics. Typically a woven or non-woven polyolefin material is coated on either one or both sides with a polymer coating. The polymer composition of the woven material and coating are normally a variation or combination of polyethylene or polypropylene. These polyolefin materials provide several benefits in that they are inert and do not absorb moisture or breakdown when exposed to harsh outdoor elements or chemicals. They can be resistant to rot and can have greatly improved UV resistance in comparison to felt.

A limitation of polyolefin roof underlayments is that these materials can be very slippery in both wet and dry conditions. Installation of the underlayment and the subsequent roofing material can therefore be problematic as workers may need to walk across or work upon the polyolefin material. This decreases the commercial attractiveness of such materials for high pitch roof applications or in climates characterized by wet or humid conditions. Accordingly, it would be desirable to provide a way to form a polymeric roofing underlayment that also provides anti-skid or enhanced friction properties.

SUMMARY

The present technology includes systems, processes, articles of manufacture, and compositions that relate to a roof underlayment having a unique anti-skid surface that provides more traction and an improved working or walking surface during installation under various environmental conditions.

Anti-skid roof underlayment and methods of making are provided. A first layer can be applied to a second layer to at least partially melt the second layer. The second layer includes a non-woven material having an area density of less than about 25 grams per square meter. The first layer and the second layer can be embossed and laminated to a substrate, where the first layer and the second layer form an embossed layer on the substrate. The embossed layer has an anti-skid surface thereon.

In various embodiments, application of the first layer to the second layer can be performed before the embossing and laminating, or application of the first layer to the second layer can be performed substantially simultaneously with the embossing and laminating step. The embossing can include contacting the second layer with a roller having a texture on a surface thereof, the texture imparting an inverse texture onto a surface of the second layer to form the anti-skid surface. The roller can include a cooling means to remove heat from the embossed layer. The embossing can also include contacting the substrate with a pressure roller, where the roller and pressure roller define a nip configured to emboss and laminate the first layer, second layer, and the substrate. The anti-skid surface can include features having one of a height and a depth of about 0.1 millimeters to about 1 millimeter.

In some embodiments, another first layer can be applied to another second layer to at least partially melt the another second layer. In this case, the embossing and laminating step includes embossing and laminating the first layers and second layers to the substrate, with one of the first layers and one of the second layers forming an embossed layer and the other of the first layers and the other of the second layers forming another embossed layer. The substrate is disposed intermediate to the embossed layers. Each embossed layer has an anti-skid surface thereon. The embossing can also include contacting each of the second layers with a roller, where each roller has a texture on a surface thereof. The texture imparts an inverse texture onto a surface of the second layer to form the anti-skid surface. The rollers define a nip configured to emboss and laminate the first layers, second layers, and the substrate. In this way, the anti-skid roof underlayment includes a second embossed layer laminated to the substrate layer, where the second embossed layer has a second anti-skid surface thereon and the substrate layer is disposed intermediate to the embossed layers.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except where otherwise expressly indicated, all numerical quantities in this description are to be understood as modified by the word "about" in describing the broadest scope of the technology.

As illustrated in FIGS. 1-6, the present technology is drawn to methods and means for making a roof underlayment 10 having an anti-skid surface and products formed thereby. The underlayment 10 can be a reinforced roof underlayment configured to replace traditional asphalt saturated felt paper that is used on top of a wood roof deck, roof trusses or frame, and under roof coverings such as shingles, tile, metal, wood, concrete or clay tile, or other exterior cladding materials. In this way, the roof underlayment 10 acts as a secondary weather resistive barrier to protect the underlying structure.

Figure 1:
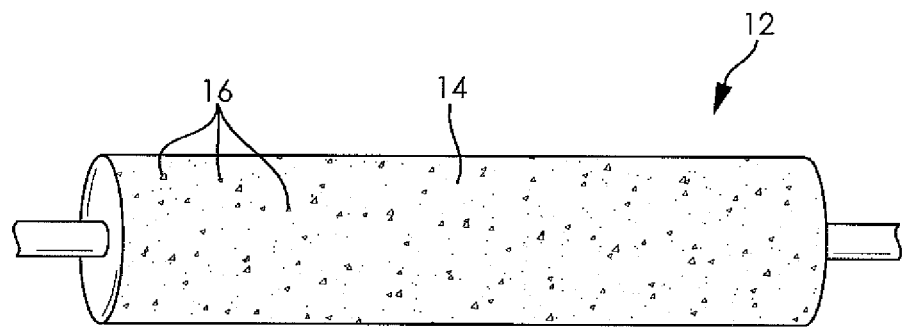
FIG. 1 is a perspective view of an embodiment of an embossing roller for use in making an anti-skid roof underlayment.

Referring to FIG. 1, a roller 12 used for forming an anti-skid or enhanced friction surface of the underlayment 10 is illustrated. The roller 12 is substantially cylindrical and includes a surface 14 configured for embossing the underlayment 10 to form the anti-skid surface. The surface 14 of the roller 12 includes a texture 16 formed by a plurality of features that are raised and/or sunken with respect to the remainder of the surface 14 of the roller 12. For example, the texture 16 can include a plurality of protrusions from the surface 14 of the roller 12, a plurality of depressions in the surface 14 of the roller 12, or both.

The texture 16 for forming the embossment on the underlayment 10 can be of varying heights or depths or can be substantially the same height or depth. Examples of heights and depths of the texture 16 include between 0.01 millimeters to 10 millimeters, between 0.1 millimeters to 1 millimeter, and between 0.1 millimeters to 0.5 millimeters. Other examples include where the texture 16 has a substantially constant height or depth of about 0.1 millimeters, about 0.5 millimeters, or about 1 millimeter. However, it is understood that the height and/or depth of the texture 16 can be tailored to provide a desired embossment on the underlayment, where certain materials may be more or less sensitive to forming an impression from contact with the roller 12.

The texture 16 can be disposed on the surface 14 of the roller 12 randomly or can be configured as a uniform or repeated pattern. As illustrated in FIG. 1, the texture 16 is disposed on the surface 14 of the roller 12 in a random configuration. Where the texture 16 is disposed as an array of uniform or repeating configurations, examples include straight lines, a cross-hatch pattern, a chevron pattern, a checked pattern, or any other pattern as desired.

The texture 16 can include raised and/or sunken features that are adjacent each other or spaced apart from each other providing various feature densities. Examples include where the texture 16 includes between 1 feature to 100 features per square centimeter of the surface 14 of the roller 12. Other examples include where there are about 10 features per square centimeter, 20 features per square centimeter, or about 50 features per square centimeter of the surface 14 of the roller 12. Additionally, the features of the texture 16 can have the same shape or can have varying shapes such as square, triangular, circular, ovular, obround, rectangular, or any other shape configured to form an anti-skid surface. In certain embodiments, the texture 16 can include a random mixture of raised and sunken features that forms a grainy pattern 14 on the roller 12. Such textures 16 can include a grainy pattern similar to sandpaper.

The roller 12 can be configured as or with a cooling means to remove heat from underlayment 10 that is being embossed therewith. In certain embodiments, the roller 12 can include a heat conductive material that operates as a heat sink to cool the underlayment 10. For example, the roller 12 can be referred to as a chilling roller 12, where at least the surface 14 and/or the texture 16 of the roller 12 can be made of metal so that the roller 12 is configured to both emboss and to cool the underlayment 10 during fabrication thereof. However, the roller 12 can cool the underlayment 10 by any cooling means as desired. For example, the roller 12 can be actively cooled by fans at opposing ends thereof or include an interior chiller or coolant flowing therethrough. It is also understood that the roller 12 can be formed by any metal material or any other material such as rubber, plastic, or ceramic, for example. The roller 12 can also include a protective layer or coating such as a metal coating (e.g., chrome or zinc plating), rubber coating, silicone coating, thermal-plastic coating, or thermal sprayed coating.

Figure 2:
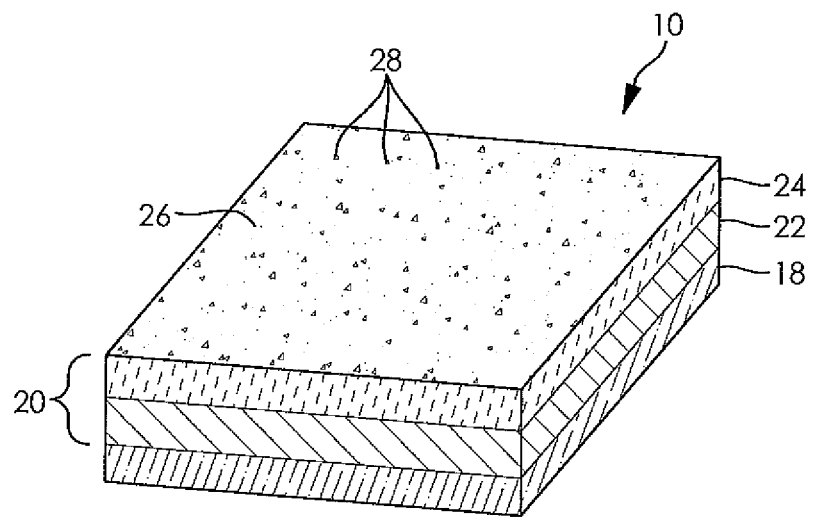
FIG. 2 is a perspective view of a portion of an embodiment of a roof underlayment with an anti-skid surface.

As shown in FIG. 2, the underlayment 10 can be a single-sided anti-skid underlayment includes a substrate layer 18 and an embossed layer 20. In some embodiments, the substrate layer 18 and/or the embossed layer 20 can be a material that is vapor permeable, while in other embodiments the substrate layer 18 and/or the embossed layer 20 can be vapor impermeable. Examples of the substrate layer 18 include a woven or non-woven substrate, scrim, mesh, or base fabric, including various woven or non-woven polyolefin materials. In embodiments where the substrate layer 18 and/or the embossed layer 20 is vapor impermeable, examples include any suitable impermeable sheet, such as films or sheets of polyolefins, including polypropylene, polyethylene or polyvinyl chloride or other impermeable weather resistant building papers. In embodiments where the substrate layer 18 and/or the embossed layer 20 is vapor permeable, examples include any suitable vapor permeable sheet that is water resistant. Vapor permeable flexible sheets may be any suitable breathable sheet material made of spun bonded synthetic fibers such as polyethylene, polypropylene or polyester fibers, sheets of spun bonded-melt blown-spun bonded polymer fibers (or other non-woven fabricated products), perforated polymer films, woven slit film, microporous film laminates, and building papers.

The substrate layer 18 can comprise a commercial roof underlayment or house wrap. In certain embodiments, the substrate layer 18 can comprise a product such as RoofLiner or Tyvek™ HomeWrap, available from DuPont (Wilmington, Del.), Typar™ HouseWrap, available from BBA Fiberweb (Old Hickory, Tenn.), or equivalents thereof. In some embodiments, the substrate layer 18 can include an insulating and/or reinforcing material, such as fiberglass, or may be combined with or coupled to an insulating and/or reinforcing material, or the substrate layer 18 can be used and/or installed in conjunction with an insulating and/or reinforcing material.

The embossed layer 20 includes a first layer 22 and a second layer 24. The first layer 22 can include one or more of a polyolefin film, a hot melt plastic film, an adhesive film or tie layer, and can be formed from a melted resin curtain. In certain embodiments, the first layer 22 is configured to at least partially melt the second layer 24 during a manufacturing process, as further described hereinbelow, and provide adhesion between the embossed layer 20 and the substrate layer 18. Where the first layer 22 at least partially melts the second layer 24, the first layer 22 and second layer 24 can intermingle and allow for a mixing of their respective materials, such as fibers or polymeric materials, therebetween. The second layer 24 can be a non-woven material that can be imparted with an anti-skid property, for example, exhibiting increased friction or traction upon being embossed.

The second layer 24 can include a thin non-woven material having an area density of less than about 25 grams per square meter. Examples of materials useful as the second layer 24 include spun bonded or needle punched polyolefin or polymeric type non-woven materials. As such, the relatively light weight (i.e., less than about 25 g/m$^2$) of the second layer 24 makes at least a portion of the second layer 24 relatively easy to melt upon contact with the first layer 22. In fact, in some embodiments, a majority of the second layer 24 can melt and intimately mix with the first layer 22, allowing a limited amount of the second layer 24 to remain. In certain cases, a portion of the non-woven material of the second layer 24 may appear to "burn-off" following contact with the first layer 22. The remaining amount of the non-woven material of the second layer 24 is thereby made resistant to fraying and piling. This is not the case with non-woven material having an area density of greater than 25 grams per square meter. Such heavier weight non-woven materials result in a second layer that can exhibit fraying or piling, where such defects can increase the slipperiness of second layer 24 and are antithetical to the formation of an anti-skid surface thereon. Thus, it has been found that use of a non-woven material of less than about 25 g/m$^2$ in area density can surprisingly reduce or prevent any fraying or pilling that would contravene the effect of embossing an anti-skid surface thereon.

In certain embodiments, the substrate layer 18 and/or the embossed layer 20 can include other materials such as a rolled-on or sprayed-on liquid that dries or cures as a film directly on another material, such as another film or sheet material or a building material or component such as sheathing material. In addition, the substrate layer 18 and/or the embossed layer 20 can include one or more of a woven material, a non-woven material, a dry-laid non-woven material, a wet-laid non-woven material, a hybrid non-woven material, a polymer-laid non-woven material, a spun-bonded non-woven material, a flash-spun non-woven material, or the like. Furthermore, natural materials, such as cellulose and other plant derived products, used alone or in conjunction with the various synthetic materials described herein can be included.

The embossed layer 20 includes a surface 26 having an inverse texture 28 formed thereon. The inverse texture 28 at least partially corresponds to the inverse of the texture 16 on the surface 14 of the roller 12. For example, the inverse texture 28 can be a substantial complement of the texture 16 on the surface 14 of the roller 12. In this manner, the inverse texture 28 can exhibit a plurality of features that are raised and/or sunken with respect to the remainder of the surface 26 of the embossed layer 20.

With reference to the figures, the embossed layer 20 is illustrated with the first layer 22 as a distinct layer from the second layer 24. However, in application, the first layer 22 and the second layer 24 can at least partially form an integral bond and/or intermingle during the manufacturing process, such that the first layer 22 and the second layer 24 may become at least partially amalgamated, especially at the interface thereof. Heat can be applied to the first layer 22 and the second layer 24 or a melted or partially melted first layer 22 can partially melt the second layer 24 upon contact, for example. The first layer 22 may also at least partially form an integral bond and/or intermingle with the substrate layer 18, so that the first layer 22 and the substrate layer 18 may become at least partially amalgamated, especially at the interface thereof. As described, the second layer 24 can include a thin non-woven material having an area density of less than about 25 grams per square meter that is made resistant to fraying and pilling upon contact with the first layer 22 and partially melting. In various embodiments, the underlayment 10 can include any number of first layers 22, second layers 24, and/or substrate layers 18, as desired. In a non-limiting example, as shown in FIG. 2, the underlayment 10 includes one embossed layer 20 formed of one first layer 22 and one second layer 24, along with one substrate layer 18.

Figure 3:
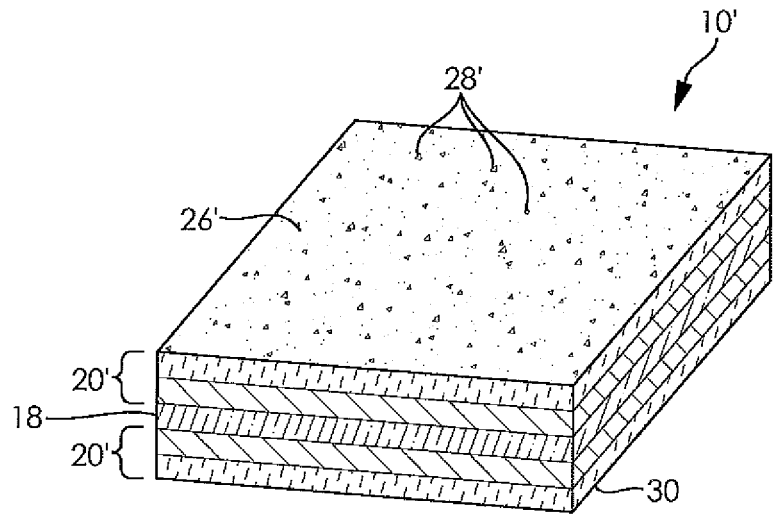
FIG. 3 is a perspective view of a portion of another embodiment a roof underlayment with an anti-skid surface.

In another non-limiting example, as shown in FIG. 3, the underlayment 10' can be a double-sided anti-skid underlayment including two embossing layers 20' and one substrate layer 18'. Structure similar to that shown in FIG. 2 are represented with the same reference numeral and a prime (') symbol for clarity. In this embodiment, the substrate layer 18' is disposed intermediate the embossing layers 20'. According to this embodiment, the underlayment 10' includes inverse texture 28' formed on the surface 26' of one of the embossing layers 20' and on an opposing surface 30 of the other of the embossing layers 20'. The inverse texture 28' formed on each of the surfaces 26', 30 can be different, similar, or identical, and/or one can have more aggressive raised and/or sunken features than the other. It is understood, the underlayment 10' can include any number of first layers 22', second layers 24', and substrate layers 18' as desired.

Figure 4:
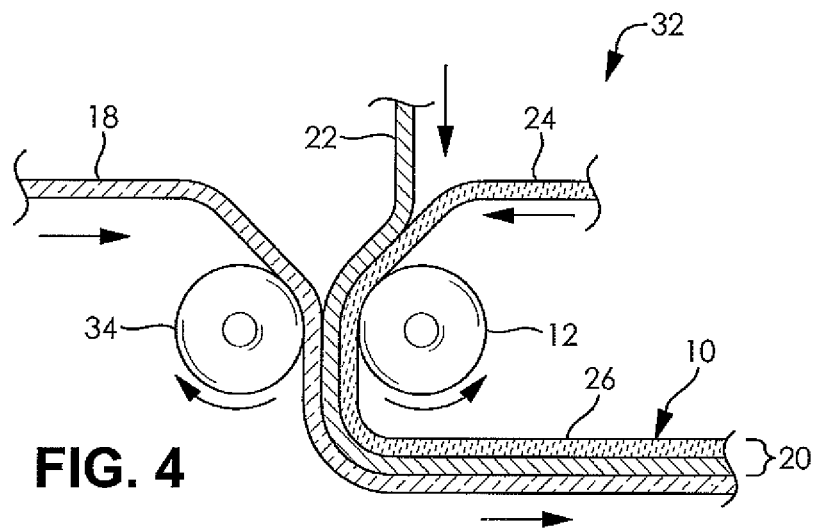
FIG. 4 is a side elevational view of an embodiment of a process for making a roof underlayment.

With reference now to FIG. 4, an embodiment of an embossing process 32 to form the underlayment 10 is illustrated, where relative movement of components is indicated by block arrows. The embossing process 32 includes the roller 12 cooperating with a pressure roller 34 to define a nip that is configured to bond the substrate layer 18, the first layer 22, and the second layer 24. The pressure roller 34 can be a rubber pressure nip roll, for example. However, the pressure roller 34 can be any roller formed of any material such as metal or plastic and can include coverings such as urethane or plastic. In a first step, the first layer 22 is heated, prior to or upstream in the embossing process 32 from the roller 12, to a temperature and applied to the second layer 24 to at least partially melt the second layer 24. For example, in this step, the first layer 22 can be a hot melt film or curtain formed from a die laid down on the second layer 24 to at least partially melt the second layer 24.

In a second step, the combined first layer 22 and the at least partially melted second layer 24 meet the substrate layer 18 and are pressed or laminated between the roller 12 and the pressure roller 34 at the nip to form the underlayment 10. As the first layer 22, second layer 24, and the substrate layer 18 are being pressed together between the roller 12 and the pressure roller 34, the texture 16 of the roller 12 is embossed onto the surface 26 of the embossed layer 20 to form the inverse texture 28. The embossed layer 20 is also bonded to the substrate 18 at this point, where the first layer 22 of the embossed layer 20 facilitates adhesion of the embossed layer 20 to the substrate layer 18. The roller 12 is configured to cool and at least partially solidify the embossed layer 20 to substantially maintain the formation of the inverse texture 28 and to militate against a warping of the underlayment 10 as it is being formed. The result of the embossed inverse texture 28 formed on the surface 26 of the embossed layer 20 is a unique anti-skid surface which provides the underlayment 10 with anti-skid properties and better traction and improves the working or walking surface thereon during installation of roof coverings under various environmental conditions.

Figure 5:
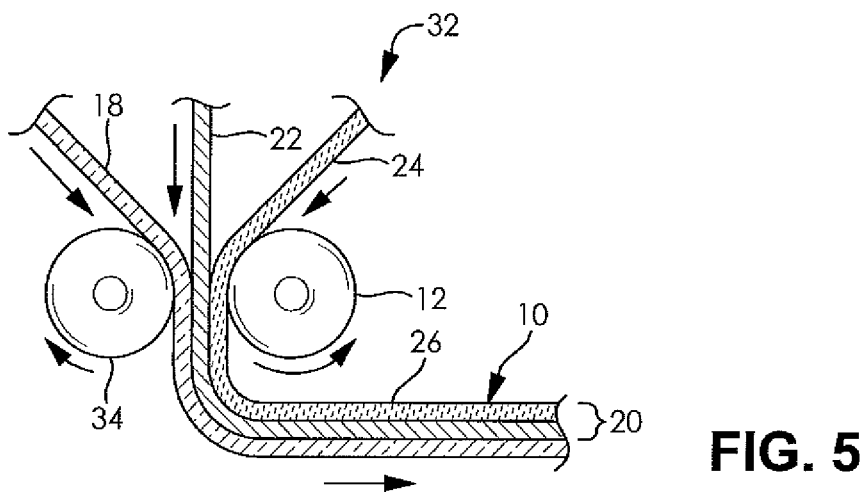
FIG. 5 is a side elevational view of an embodiment of another process for making a roof underlayment.

Referring now to FIG. 5, the embossing process 32 for forming the underlayment 10 is illustrated according to another embodiment, where relative movement of components is again indicated by block arrows. In this case, a one step process is employed wherein the first layer 22 is heated and applied as a hot curtain of extrusion coating or film, for example, intermediate of the substrate layer 18 and the second layer 24 while the substrate layer 18 and the second layer 24 are being pressed between the roller 12 and pressure roller 34. In this embodiment, the first layer 22, the second layer 24, and the substrate layer 18 are pressed through the nip in one step, in a substantially simultaneous fashion. As the substrate layer 18, first layer 22, and second layer 24 are being pressed or laminated by the roller 12 and pressure roller 34, the texture 16 of the roller 12 is embossed onto the surface 26 of the embossed layer 20 to form the inverse texture 28. The inverse texture 28 correspond to the texture 16 formed on the surface 14 of the roller 12. The first layer 22 of the embossed layer 20 facilitates adhesion of the embossed layer 20 to the substrate layer 18. The roller 12 is configured to cool and at least partially solidify the embossed layer 20 to maintain the formation of the inverse texture 28 and to militate against a warping of the underlayment 10 as it is being formed. The result of the embossed inverse texture 28 formed on the surface 26 of the embossed layer 20 is a unique anti-skid surface which provides the underlayment 10 with anti-skid properties and better traction and improves the working or walking surface thereon during installation of roof coverings under various environmental conditions.

Figure 6:
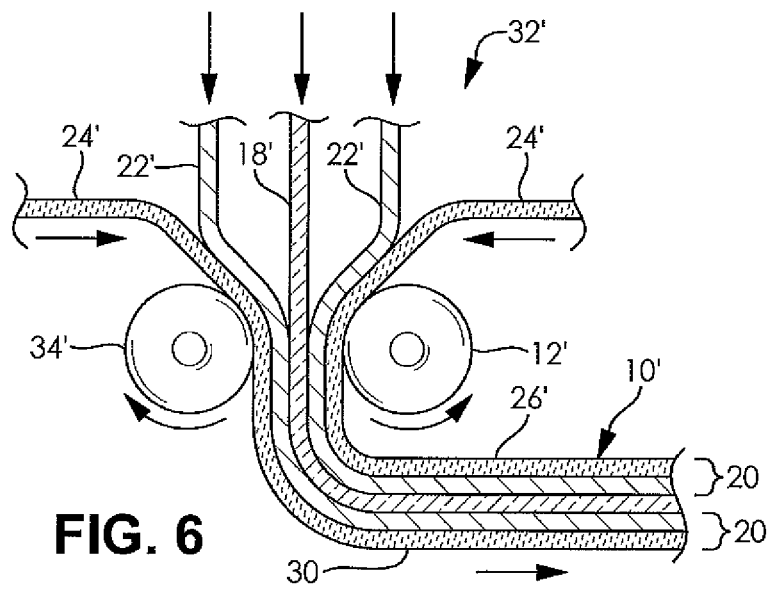
FIG. 6 is a side elevational view of an embodiment of yet another process for making a roof underlayment.

With reference to FIG. 6, an embossing process 32' for forming a double-sided anti-skid underlayment 10' having two embossing layers 20' is illustrated, where relative movement of components is indicated by block arrows. Structure similar to that illustrated in FIGS. 4 and 5 include the same reference numeral and a prime symbol (') for clarity. The embossing process 32' includes the roller 12' cooperating with the pressure roller 34' to bond the substrate layer 18' to two embossed layers 20'. According to this embodiment, the pressure roller 34' is configured to operate in a substantially similar or identical fashion to roller 12'. That is, roller 34' can be have the attributes as described herein for roller 12. Briefly, pressure roller 34' can be configured to emboss and to cool the underlayment 10' during formation of the underlayment 10'. The pressure roller 34' further includes a texture 16' as described herein, for forming an inverse texture 28' on the surface 30 of the underlayment 10'. The texture 16' on the pressure roller 34' can be different, substantially similar, or identical, and/or can include more or less aggressive raised and/or sunken features than the texture 16 on the roller 12'.

In a first step, each of the first layers 22' are heated, prior to or upstream in the embossing process 32' from the roller 12' and the pressure roller 34', to a temperature and applied to each of the second layers 24' to at least partially melt each of the second layers 24'. For example, in this step, the first layers 22' can be a hot melt film or curtain formed from a die laid down on each of the second layers 24' to at least partially melt each of the second layers 24'.

In a second step, each of the first layers 22', second layers 24', and the substrate layer 18' meet at the roller 12' and the pressure roller 34' and are pressed or laminated at the nip defined by the roller 12' and the pressure roller 34' to bond each of the first layers 22' and second layers 24' to the substrate layer 18' to form the underlayment 10'. In this embodiment, the substrate layer 18' is intermediate the first layers 22' and the second layers 24' in forming the embossed layers 20' and substrate layer 18' upon being pressed or laminated together. As the embossed layers 20' and the substrate layer 18' are being embossed, the texture 16' of the roller 12' forms an inverse texture 28' on the surface 26' of one of the embossed layers 20', which is a substantial complement of the texture 16' formed on the surface 14' of the roller 12'. The texture 16' of the pressure roller 34' forms another inverse texture 28' on the surface 30 of the other one of the embossed layers 20', which is a substantial complement of the texture 16' formed on the pressure roller 34'. The first layers 22' of the embossing layers 20' facilitate adhesion of the embossing layers 20' to the substrate layer 18'. The roller 12 and the pressure roller 34' are configured to cool and at least partially solidify the embossing layers 20' to maintain the formation of the inverse textures 28' and to militate against a warping of the underlayment 10' as it is being formed. The result of the inverse textures 28' formed on the surfaces 26', 30 of the embossing layers 20' is a unique anti-skid surface on each side of the underlayment 10' that gives the underlayment 10' more traction and provides an improved working or walking surface during installation of roof coverings under various environmental conditions. In this manner, the underlayment 10' can be installed in roofing applications without concern to orientation or the various inverse textures 28' can be configured to perform with certain surfaces. For example, one of the inverse textures 28' can be tailored to provide anti-skid properties for workers to walk on during installation of a roof while the other inverse texture 28' can be tailored to provide increased friction against a particular building material upon which the underlayment 10' is installed.

As shown, FIG. 6 illustrates a two step process for forming the double-sided anti-skid underlayment 10' with two embossing layers 20', with similar aspects to those shown in FIG. 4. However, it is understood that the underlayment 10' can be formed by a one step process, similar to that shown in FIG. 5, wherein the first layers 22', the second layers 24', and the substrate layer 18' are pressed through the nip in one step, in a substantially simultaneous fashion.

In certain embodiments, the underlayment 10, 10' formed by the embossing process 32, 32' is a flexible sheet comprising one or more substrate layers 18, 18' and one or more embossing layers 20, 20'. In some embodiments, the flexible sheet of underlayment 10, 10' can be provided in an indefinite-length elongate web that is capable of being stored and shipped in a spirally wound roll. Other shapes and forms of the flexible sheet include strips, perforated sheets, and precut sheets.

Various additives can be included or applied to the underlayment 10, 10'. Examples include various colorants, heat stabilizers, waterproofing treatments, strengthening laminates, antimicrobials, UV blockers and light stabilizers, and flame retardants. The underlayment 10, 10' can be also be printed with signage, such as logos, installation instructions, and orientation indicia. In certain aspects the underlayment 10, 10' can include suitable additives. The underlayment 10, 10' can include an insulating material, such as fiberglass, or may be combined with or coupled to an insulating material, or the sheet can be used and/or installed in conjunction with an insulating material.

In application, the underlayment 10, 10' is applied beneath a roofing material such as composite shingles, metal panels or shingles, concrete or clay tiles, wood shakes, slate, concrete and clay tile, and the like. The underlayment 10, 10' is positioned such that the inverse texture 28 (or one of the inverse textures 28') is facing upwards. The inverse texture 28, 28' formed on at least one surface of the underlayment 10, 10' forms an enhanced friction surface thereon such that during installation, the enhanced friction surface or anti-skid surface militates against slipping and facilitates working or walking traction during installation of the underlayment 10, 10' and roofing materials. Also, attachment or adhesion of the underlayment 10, 10' to other roofing materials can be enhanced.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of making an anti-skid roof underlayment comprising:
    applying a first layer to a second layer to at least partially melt the second layer, wherein the second layer includes a non-woven material having an area density of less than about 25 grams per square meter and a portion of the non-woven material burns off following contact with the first layer; and
    embossing and simultaneously laminating the first layer and the second layer to a substrate, the first layer and the second layer forming an embossed layer on the substrate, the first layer intermediate to the substrate and the second layer, the embossing resulting in the second layer having an anti-skid surface directly thereon.

2. The method of claim 1, wherein the first layer is heated prior to application to the second layer.

3. The method of claim 1, wherein the applying step is performed before the embossing and laminating step.

4. The method of claim 1, wherein the applying step is performed substantially simultaneously with the embossing and laminating step.

5. The method of claim 1, wherein the embossing comprises contacting the second layer with a roller having a texture on a surface thereof, the texture imparting an inverse texture onto a surface of the second layer to form the anti-skid surface.

6. The method of claim 5, wherein the roller comprises a cooling means to remove heat from the embossed layer.

7. The method of claim 5, wherein the embossing comprises contacting the substrate with a pressure roller, where the roller and pressure roller define a nip configured to emboss and laminate the first layer, second layer, and the substrate.

8. The method of claim 1, wherein the anti-skid surface comprises features having one of a height and a depth of about 0.1 millimeters to about 1 millimeter.

9. The method of claim 1, wherein the first layer comprises one of a hot melt plastic film and a melted resin curtain and the substrate comprises a woven material.

10. The method of claim 1, further comprising:
    applying another first layer to another second layer to at least partially melt the another second layer;
    wherein the embossing and laminating step includes embossing and laminating the first layers and second layers to the substrate, one of the first layers and one of the second layers forming an embossed layer, the other of the first layers and the other of the second layers forming another embossed layer, the substrate intermediate to the embossed layers, the embossed layers each having an anti-skid surface thereon.

11. The method of claim 10, wherein the embossing comprises contacting each of the second layers with a roller, each roller having a texture on a surface thereof, the texture imparting an inverse texture onto a surface of the second layer to form the anti-skid surface, where the rollers define a nip configured to emboss and laminate the first layers, second layers, and the substrate.

12. The method of claim 11, wherein the applying step is performed before the embossing and laminating step.

13. The method of claim 11, wherein the applying step is performed substantially simultaneously with the embossing and laminating step.

14. A method of using an anti-skid roof underlayment comprising:
    making the anti-skid roof underlayment by:
        applying a first layer to a second melt the second layer, wherein the second layer includes a non-woven material having an area density of less than about 25 grams per square meter and a portion of the non-woven material burns off following contact with the first layer; and
        embossing and simultaneously laminating the first layer and the second layer to a substrate, the first layer and the second layer forming an embossed layer on the substrate, the first layer intermediate to the substrate and the second layer, the embossing resulting in the second layer having an anti-skid surface directly thereon; and
    positioning the anti-skid roof underlayment on a roof.

* * * * *